Jan. 7, 1930. J. C. HAUN 1,742,505
PROCESS OF RECOVERING CYANOGEN COMPOUNDS FROM GASES
Filed March 23, 1927
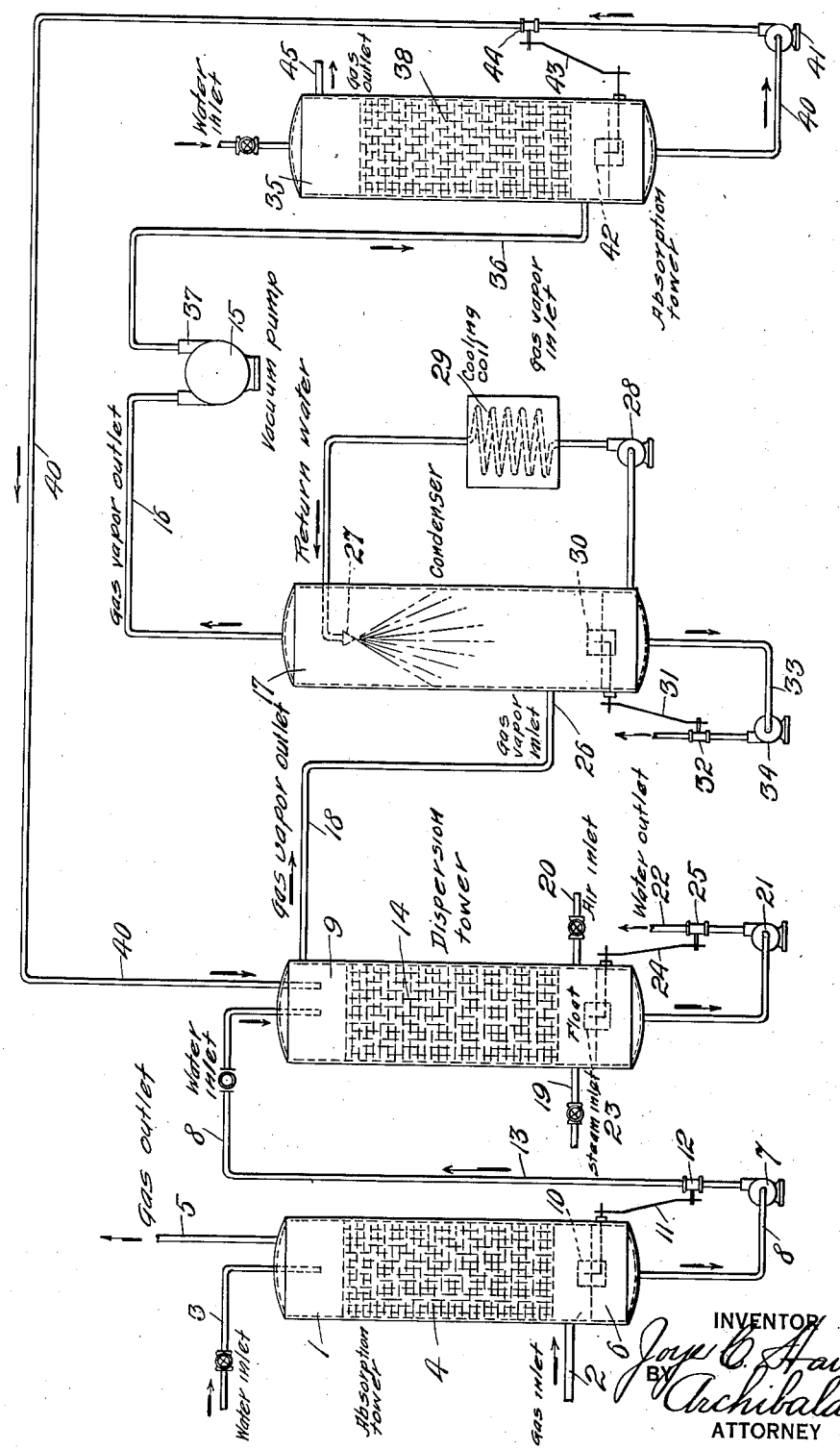

Patented Jan. 7, 1930

1,742,505

UNITED STATES PATENT OFFICE

JOYE C. HAUN, OF BERKELEY, CALIFORNIA, ASSIGNOR TO THE MERRILL COMPANY, OF SAN FRANCISCO, CALIFORNIA, A CORPORATION OF CALIFORNIA

PROCESS OF RECOVERING CYANOGEN COMPOUNDS FROM GASES

Application filed March 23, 1927. Serial No. 177,741.

The invention relates to a process of recovering cyanogen compounds from gases, and more particularly from illuminating and fuel gases.

It has long been recognized that cyanogen compounds or cyanides, such as hydrogen cyanied, are formed when carbonaceous compounds are burned or distilled in processes producing illuminating and fuel gases, and it has been proposed heretofore to treat these gases to recover the cyanides from them. To the best of my knowledge, all these prior processes, whether proposed or in commercial use, involve the use of absorbent substances, such as a ferrous salt and an alkali, or a precipitated metal sulphide and an alkali, with which to form new compounds of the cyanides in the gases before recovering the cyanides from the gases. That is to say, all these prior processes have proposed combining the cyanides with other elements, not contained in the gas, before the recovery of the cyanides in the concentrated form suitable for commercial use. The processes involved in the production of simple cyanides from these new compounds are both complicated and expensive.

One object of the present invention is to produce a process by which the cyanogen compounds can be recovered from illuminating and fuel gases without first combining them with other elements. Another object of the present invention is to recover the cyanogen compounds from illuminating and fuel gases in a pure state at a relatively low cost. To these ends the invention consists in scrubbing or contacting the illuminating or fuel gas with a sufficient quantity of water to absorb all the cyanides contained in the gas. This is conveniently accomplished by passing the gas and the water counter-current to each other through a tank or tower called an absorption or scrubbing tower. This tower contains a number of grids so designed as to offer a minimum of resistance to the passage of the gas therethrough and at the same time to expose a maximum of surface on which the absorbing solution is exposed in thin films to contact with the gas. The water used for absorbing the cyanide from the gas may be either pure water ($H_2O$) or it may contain varying amounts of salts which do not react with the cyanides to form chemical compounds. The term "water", therefore, includes any neutral aqueous solution which does not contain substances which will react with the cyanides in the gases treated. By suitably controlling the volume and the temperature of the water, substantially all the cyanogen compounds contained in the gas can be dissolved in the water. If the water used for scrubbing the gas is neutral or acid in reaction the cyanogen compounds in the gas will dissolve in the water as hydrogen cyanide (HCN). If the water becomes alkaline or basic, that is to say, if ammonia is contained in the gas, it will form with the water ammonium hydroxide ($NH_4OH$). If the temperature of the water is below 79.9° F., this ammonium hydroxide will react with the hydrogen cyanide and form ammonium cyanide ($NH_4CN$). If the temperature of the water is above 79.9° F., the ammonium hydroxide will remain in solution as such and have no effect on the hydrogen cyanide. The gases treated will usually contain hydrogen sulphide and a part of this hydrogen sulphide will be absorbed in the aqueous solution with the cyanogen compounds.

The water which is discharged from the absorption tower is an extremely dilute solution of the cyanogen compounds, usually not more than four-fifths of a pound of hydrogen cyanide or its equivalent in cyanogen (CN) being contained in a ton of solution. To recover the cyanogen compounds, such as the hydrogen cyanide. and the hydrogen sulphide, I subject the solution to a pressure less than atmospheric and to a temperature sufficient to cause rapid evaporation of the solution at that pressure, and preferably above the boiling point of the hydrogen cyanide. This is done in a tank or tower connected with an exhaust pump and called a dispersion tower. This tower contains wood grids, or their equivalent, designed to divide the falling streams of solution into thin films and droplets, thus causing rapid evaporation under the existing conditions of temperature and pressure.

The solution in the dispersion tower may be raised to the required temperature in several ways, as by introducing steam directly into the dispersion tower or by heating the solution before it enters the dispersion tower. Usually the solution leaving the absorption tower is hot enough to boil in the dispersion tower at the pressure used without requiring additional heating. As the gases leave the retort in which they are produced, they are at a high temperature, frequently as much as 1600° F. They are usually partly cooled by passing them through condensers. Then by passing them through the absorption tower as a further step in the process of cooling them, the heat taken up from the gases will be sufficient to raise the cooling water or the aqueous cyanide solution to the required degree for treatment in the dispersion tower. The water in the absorption tower, however, must be kept below the boiling point, namely 212° F., otherwise the cyanogen compounds in the gas will not completely dissolve in the water.

The treatment of the aqueous solution of hydrogen cyanide and hydrogen sulphide in the dispersion tower consists in contacting the solution under a low absolute pressure with an atmosphere which will greatly reduce the partial pressure of the hydrogen cyanide and hydrogen sulphide in the vapor in relation to the vapor pressure of the hydrogen cyanide and hydrogen sulphide in the solution, thereby causing rapid evaporation of the hydrogen cyanide and hydrogen sulphide from the solution. A mixture of water vapor and air may be used for this purpose. However I prefer to employ a vapor more readily condensable than hydrogen cyanide in order to facilitate the subsequent condensation and separation of the hydrogen cyanide from the vapors and gases withdrawn from the dispersion tower. Any ammonium cyanide present in the solution will be broken up in the dispersion tower, forming hydrogen cyanide and ammonium hydroxide ($NH_4OH$). Most of the ammonium hydroxide remains in the solution, only small quantities of ammonia ($NH_3$) being converted into the gaseous form and commingling with the gaseous hydrogen cyanide, air and water vapor.

Since the combined vapors and gases leaving the dispersion tower contain appreciable amounts of hydrogen sulphide ($H_2S$) which was dissolved out of the gases passing through the absorption tower, it is necessary to separate this hydrogen sulphide from the hydrogen cyanide before the latter is further treated to make it available for commercial use, as by converting it into liquid hydrogen cyanide or an alkali cyanide. If the hydrogen sulphide is not separated from the hydrogen cyanide and the latter is treated with an alkali, a sulpho-cyanide will be produced and mixed with the alkali cyanide. Sulpho-cyanide cannot be used for the purposes for which alkali cyanide is used, and its presence in the alkali cyanide materially lessens the value of the latter.

To separate the hydrogen sulphide from the water and hydrogen cyanide vapor leaving the dispersion tower, I pass the mixture through a condenser under reduced pressure at a temperature below the boiling point of the hydrogen cyanide at this pressure. At this temperature and pressure substantially all the water vapor and hydrogen cyanide vapor will condense. There will be no condensation of the hydrogen sulphide gas and no appreciable dissolving of the hydrogen sulphide gas in the water and hydrogen cyanide condensate; therefore the hydrogen sulphide will pass out of the condenser mixed with uncondensed gases which include small amounts of water vapor and uncondensed hydrogen cyanide vapors which do not condense. If any ammonia is present it will be condensed with the water and hydrogen cyanide.

If a higher degree of concentration of hydrogen cyanide in the aqueous hydrogen cyanide solution is desired, the condensate from the condenser may be passed through a second dispersion tower and a second condenser.

The hydrogen cyanide in the aqueous solution or condensate withdrawn from the condenser may be converted to a form suitable for commercial use, such, for example, as an alkali cyanide by adding caustic alkali, as for instance, caustic soda, to the solution, evaporating the solution and producing thereby sodium cyanide. Or, the aqueous solution of hydrogen cyanide may be treated by any one of several well known processes for the production of liquid hydrogen cyanide, for which a ready market exists.

If it is desirable to recover the small quantities of hydrogen cyanide which leave the condenser with the hydrogen sulphide and uncondensed gases, this can be done by passing the combined gases through a second absorption tower through which water is circulated to condense the water vapor and hydrogen cyanide. The aqueous hydrogen cyanide solution thus formed may be returned to the dispersion tower for the recovery of the contained hydrogen cyanide. The unabsorbed hydrogen sulphide which leaves the second absorption tower will be in a relatively pure state and may be treated by any one of several well known methods to utilize its sulphur content.

The accompanying drawing is a flow sheet or diagrammatic representation of a series of connected apparatus in which the improved process in its preferred form may be practiced. The illuminating and the fuel gases from which the cyanides are to be recovered are introduced into the bottom of a scrubbing or absorption tower 1 through a pipe or conduit 2, leading either from the retort in which the gases are produced or from a condenser in which the hot gases are partly cooled before they enter the absorption tower. To scrub or remove the cyanides, and any hydrogen sulphide contained in the gases, water or other suitable aqueous solution is introduced into the top of the tower through a pipe 3. In order that the water or aqueous solution may most effectively absorb the cyanides from the gas, the tower 1 is provided with grids 4 of usual construction and arrangement in apparatus of this type by which the liquid is finely divided, that is, broken up into tenuous films and droplets, thereby exposing the maximum of liquid surface to the gas. Inasmuch as the gas and liquid flow through the absorption tower counter-current to each other, the gas which is discharged from the top of the tower through the outlet pipe 5 is almost completely impoverished of cyanogen compounds. A part of the hydrogen sulphide contained in the gas will be absorbed along with the cyanogen compounds.

The water which has passed down through the grids 4 in the tower 1 and absorbed from the gas the cyanogen compounds and other absorbable substances, such as hydrogen sulphide, accumulates in the bottom part 6 of the tower whence it is withdrawn by a pump 7 and introduced through the pipe 8 into the top of a dispersion tower 9. To maintain a uniform level of the liquid in the bottom of the tower 1 and therefore a proper functioning of the pump 7, the tower 1 is provided with a float 10 connected by a lever 11 with a control valve 12 in the section 13 of the pipe 8 leading from the bottom of the tower 1 to the top of the tower 9.

The tower 9 is of substantially the same construction as the tower 1 and is provided with a series of grids 14 by which the hydrogen and hydrogen sulphide solution introduced into the tower is finely divided so that the hydrogen cyanide and the hydrogen sulphide may be most effectively dispersed therefrom by evaporation. To facilitate evaporation the hydrogen cyanide and hydrogen sulphide solution in the dispersion tower 9 is subjected to reduced pressure. For this purpose I provide a vacuum pump 15 which acts on the dispersion tower through the pipe 16, the condenser 17 and the pipe 18. Usually the hydrogen cyanide and hydrogen sulphide solution entering the dispersion tower 9 will be hot enough to give the desired rate of evaporation at the reduced pressure used without further heating the solution. If the temperature of the solution in the dispersion tower 9 is not sufficiently high to effect the required rate of evaporation of the hydrogen cyanide and the hydrogen sulphide, the necessary additional amount of heat may be imparted to the solution by means of steam introduced into the bottom of the tower 9 through the steam pipe 19. The evaporation of the hydrogen cyanide and the hydrogen sulphide is facilitated by evaporation of the water content of the solution and if the temperature maintained within the tower 9 is sufficiently high to keep the steam in the gaseous form it will act as an additional carrier of the evaporting hydrogen cyanide and hydrogen sulphide. As an additional carrying agent for the evaporated hydrogen cyanide and hydrogen sulphide, a non-condensable gas, that is, a gas which is not condensable under the conditions existing within the apparatus, such as air, may be introduced into the tower 9 through the pipe 20.

The evaporation of the mixed hydrogen cyanide and hydrogen sulphide gases from the aqueous solution in the dispersion tower is preferably conducted under pressure less than atmospheric for several reasons:—(1) It conserves heat. The temperature to which it would be necessary to raise large volumes of aqueous solution to accomplish the evaporation under substantial positive pressure would be prohibitive. (2) It reduces the volume of condensate. By conducting the dispersion operation at a pressure less than atmospheric the substantially complete evaporation of the hydrogen cyanide and hydrogen sulphide is effected with a minimum volume of water vapor which must subsequently be condensed with the hydrogen cyanide. This results from the fact that a given weight of water vapor or steam occupies a very much greater volume at reduced pressure and therefore at this reduced pressure a given unit of steam is much more effective. The function of the steam or water vapor is to surround the aqueous solution of hydrogen cyanide and hydrogen sulphide with an atmosphere in which the vapor pressure of hydrogen cyanide and hydrogen sulphide is less than the vapor pressure of these gases in the aqueous solution, and at a pressure substantially less than atmospheric, the amount of water required to produce this necessary volume is very much reduced. (3) There is a more complete separation of the hydrogen cyanide and hydrogen sulphide in the condenser at reduced pressure. The solubility of hydrogen sulphide in the condensate is a function of temperature and pressure within the condenser, and by keeping the pressure substantially less than atmospheric the condensate will contain no more than traces of hydrogen sulphide.

The impoverished solution accumulates in the bottom of the dispersion tower 9 and is recirculated through the absorption tower 1 by means of the pump 21, the discharge end of the pump being connected by the pipe 22 with the inlet pipe 3 leading into the top of the tower 1. If necessary to properly regulate the temperature of the water a cooling tower may be used between the pump 21 and the inlet of the tower 1. To facilitate the proper functioning of the pump 21, the water in the bottom of the tower 9 is kept at substantially a predetermined level by means of a float 23 connected by the lever 24 with a valve 25 in the pipe 22.

The hydrogen cyanide is expelled from the solution in the tower 9 as a vapor along with the water vapor from the evaporating water and the steam, where the conditions maintain the steam in gaseous form. Any hydrogen sulphide present in the solution in the tower 9 is given off in the gaseous form. This mixture of vapors and gases is discharged from the upper part of the dispersion tower 9 through the pipe 18 and enters the condenser 17 near the bottom thereof through the pipe 26. The mixture of vapors and gases is passed through the condenser 17 for the purpose of separating the water and hydrogen cyanide (and ammonia, if present) from the hydrogen sulphide and air. This can be done by cooling the mixture below the boiling point of hydrogen cyanide in any well-known manner, as by introducing a spray of cold water into the top of the condenser 17 through the nozzle 27. A sufficient quantity of the condensate accumulating in the bottom of the condenser 17 is withdrawn and cooled to serve as the cooling medium, as by connecting the bottom of the condenser 17 with a pump 28 and passing the condensate drawn from the condenser through a cooling coil 29. The concentrated hydrogen cyanide solution accumulating in the bottom of the condenser 17 is kept at substantially a predetermined level by means of a float 30 connected by a lever 31 with a valve 32 in the discharge pipe 33 leading from the bottom of the condenser. The pump 34 may be employed to conduct the hydrogen cyanide to any desired point for further treatment.

The hydrogen sulphide and air passing out of the top of the condenser 17 through the pipe 16 will usually contain small amounts of water vapor and hydrogen cyanide. If the amount of hydrogen cyanide is sufficient to justify recovery, the mixture of vapor and gas will be introduced into the bottom of a second absorption tower 35 through the pipe 36 connected with the discharge 37 of the vacuum pump 15. To absorb the hydrogen cyanide from the mixture of vapor and gas entering the tower 35 I pass a stream of water down through the grids 38 in the tower by means of pipe 39. The weak hydrogen cyanide solution accumulating in the bottom of the tower 35 is conducted to the disperser tower 9 through the pipe 40 by means of the pump 41. The level of the solution at the bottom of the tower 35 is kept substantially constant by means of the float 42 connected by the lever 43 with the valve 44 in the pipe 40. The mixture of air and hydrogen sulphide from which the hydrogen cyanide and water vapor have been washed, passes out of the top of the tower 35 through the conduit 45 and may be conducted to a sulphur burner for the recovery of the sulphur.

Having thus described the invention what I claim as new is:

1. The process of recovering hydrogen cyanide from gases containing cyanogen compounds and hydrogen sulphide which consists in contacting the gas with an aqueous solution containing no substance capable of forming compounds with the hydrogen cyanide, subjecting the hydrogen cyanide and hydrogen sulphide solution thereby produced to pressure less than atmospheric at a temperature sufficient to boil the solution and thereby evaporating the hydrogen cyanide and hydrogen sulphide mixed with water vapors, and then separating the hydrogen sulphide from the hydrogen cyanide by passing the water and hydrogen cyanide and sulphide vapors through a condenser at a temperature below the boiling point of hydrogen cyanide.

2. The process of recovering hydrogen cyanide from gases containing cyanogen compounds and hydrogen sulphide which consists in contacting the gas with an aqueous solution containing no substance capable of forming compounds with the hydrogen cyanide, treating the hydrogen cyanide and hydrogen sulphide solution thereby produced at pressure less than atmospheric so as to evaporate from it the hydrogen cyanide and the hydrogen sulphide mixed with water vapor, and separating the hydrogen sulphide from the hydrogen cyanide by condensing the water and hydrogen cyanide vapors at a temperature below the boiling point of hydrogen cyanide.

3. The process of recovering cyanides from gases containing cyanogen compounds and hydrogen sulphide which consists in absorbing the cyanide and hydrogen sulphide from the gas in an aqueous solution, evaporating the cyanide and the hydrogen sulphide mixed with water vapor from the solution at pressure less than atmospheric, and condensing the cyanide and water vapors to separate them from the hydrogen sulphide.

4. The process of recovering cyanides from gases containing cyanogen compounds and other compounds dissolvable in water which consists in contacting the gas with water to absorb from the gas the cyanide and any other dissolvable substance contained in the gas, evaporating the cyanide and other volatile substances mixed with water vapor from the solution at pressure less than atmospheric, and condensing the cyanide and water vapors to separate them from the other volatile substances.

5. The method of recovering the hydrogen cyanide and hydrogen sulphide dissolved in aqueous solutions which consists in subjecting the solution to pressure less than atmospheric at a temperature sufficient to boil the solution to cause the expelled water vapor to carry off the liberated hydrogen cyanide vapor and hydrogen sulphide gas, and passing the mixture of vapors and gas through a condenser at a temperature below the boiling point of hydrogen cyanide to condense the water and hydrogen cyanide and thereby separate the hydrogen sulphide from them.

6. The process of recovering hydrogen cyanide from gases containing cyanogen compounds and hydrogen sulphide which consists in contacting the gas with water to absorb from the gas substantially all the hydrogen cyanide therein and part of the hydrogen sulphide, removing the hydrogen cyanide and hydrogen sulphide from the aqueous solution thus formed by continuously diluting the atmosphere surrounding the aqueous solution with a condensable gas in excess of the quantity which will be condensed at a pressure substantially less than atmospheric, introducing the gases into a condenser under a pressure substantially less than atmospheric to condense the condensable gas and the hydrogen cyanide, and separately removing the condensate and the uncondensed hydrogen sulphide from the condenser.

JOYE C. HAUN.